US011540446B2

(12) United States Patent
Baker et al.

(10) Patent No.: US 11,540,446 B2
(45) Date of Patent: Jan. 3, 2023

(54) METHOD FOR OPERATING A ROUND BALER AND A ROUND BALER

(71) Applicant: Kverneland Group Ravenna S.r.l., Russi (IT)

(72) Inventors: Tim Baker, Shropshire (GB); Seamus Varley, Dublin (IE)

(73) Assignee: KVERNELAND GROUP RAVENNA S.R.L, Russi (IT)

( * ) Notice: Subject to any disclaimer, the term of this patent is extended or adjusted under 35 U.S.C. 154(b) by 384 days.

(21) Appl. No.: 16/639,077

(22) PCT Filed: Jul. 26, 2018

(86) PCT No.: PCT/EP2018/070294
§ 371 (c)(1),
(2) Date: Feb. 13, 2020

(87) PCT Pub. No.: WO2019/038018
PCT Pub. Date: Feb. 28, 2019

(65) Prior Publication Data
US 2020/0205347 A1    Jul. 2, 2020

(30) Foreign Application Priority Data
Aug. 21, 2017  (EP) ..................................... 17187076

(51) Int. Cl.
*A01F 15/07*      (2006.01)
*A01F 15/10*      (2006.01)

(52) U.S. Cl.
CPC ...... *A01F 15/0705* (2013.01); *A01F 15/0715* (2013.01); *A01F 15/106* (2013.01); *A01F 2015/072* (2013.01); *A01F 2015/076* (2013.01)

(58) Field of Classification Search
CPC .............. A01F 15/0705; A01F 15/0715; A01F 2015/072
See application file for complete search history.

(56) References Cited

U.S. PATENT DOCUMENTS 4,790,125 A  *  12/1988  Merritt, III ......... A01F 15/0715
                                                              53/118
5,115,734 A       5/1992  Quartaert
(Continued)

FOREIGN PATENT DOCUMENTS

DE       19626526 C1  *  7/1997  ......... A01F 15/0715
EP        1254761 A2       11/2002
(Continued)

OTHER PUBLICATIONS

International Search Report issued in connection with PCT Application No. PCT/EP2018/070294 dated Sep. 27, 2018.

*Primary Examiner* — Stephen F. Gerrity
(74) *Attorney, Agent, or Firm* — Dennemeyer & Associates, LLC (57) ABSTRACT

The present disclosure relates to a method for operating a round baler. The method comprises providing a nonstop baler type machine; feeding of crop into a prechamber and a main bale forming chamber; and providing, by a binding unit, a binding material to the main bale forming chamber for wrapping a bale formed in the main bale forming chamber, comprising, in a first mode of operation, providing a stretching apparatus in contact with the binding material, thereby, applying a compressive force to the binding material for stretching the binding material; and in a second mode of operation, providing the stretching apparatus free of contact with the binding material. Furthermore, a round baler is disclosed.

7 Claims, 7 Drawing Sheets

(56) References Cited

U.S. PATENT DOCUMENTS 5,289,672 A    3/1994  Underhill
2003/0024406 A1*  2/2003  Geiser .................. B30B 9/3082
                                                              100/8

FOREIGN PATENT DOCUMENTS

EP          3199015  A1   8/2017
WO       2005096801  A1  10/2005

* cited by examiner

METHOD FOR OPERATING A ROUND BALER AND A ROUND BALER

CROSS-REFERENCE TO RELATED APPLICATIONS

This is a 35 U.S.C. 371 National Stage Patent Application of International Application No. PCT/EP2018/070294, filed Jul. 26, 2018, which claims priority to European application 17187076.9, filed Aug. 21, 2017, each of which is hereby incorporated by reference in its entirety.

BACKGROUND

A baling machine, usually existing of the round or rectangular bale type is used to package crop material into a round or rectangular shape.

A baling machine can be divided up into various areas of components and apparatuses. One of the primary components of the baler is the binding unit usually commonly used to apply a twine/net or a sheeted type material to the bale of product. The binding apparatus can be located on the baler in various locations depending on the type of machine and its use.

Applying binding material to the bale can be a difficult process to achieve high levels of reliability. In particular, problems exist with sheeted materials in that the surface of the material is not of the mesh type and as a result the crop on the bale does not bond with the binding material as efficient as of the mesh type of binding. As a result, the binding sheet type material can often fail to follow the circumference of the bale and may instead follow a rotating component of the baling machine.

In general the machines that can apply this type of sheet binding material, the operator needs to manipulate the intake of crop into the machine as the binding material is being fed into the baling chamber so the incoming crop can enclose the first parts of the sheet material within layers of crop so the sheet binding material is trapped between the crop layers and as a result can successfully follow around the circumference of the bale without leaving the baling chamber.

This intake of crop material to enclose the first parts of the binding material with the crop on the bale is not automated by the machine but instead is solely carried out by the skill of the operator of the machine. This is a difficult process and can also be very unreliable as the operator has to judge the quantity of crop entering the machine and also judge the forward speed correctly of the baling machine. In a standard stop start baler, the driver needs to stop when the baling chamber is full in order to apply the binding material. If the driver stops too early the first part of the binding material will not be enclosed in the bale and the binding material may not follow the bales circumference, if the driver drives forward too far after the baling chamber is full, the first part of the binding material will be enclosed too far beneath the bales surface and excess crop will cover the plastic causing issues at a later stage with the preservation of the crop material and the removal of the binding material. The issues also include incorrect over lap of the binding material, excess crop between the binding layers allowing air or and moisture to enter the bale and/or accumulative issues when trying to remove the binding material from the bale.

Another problem with the binding material of the sheeted plastic type is providing a reliable apparatus to feed the plastic into the chamber, to provide a stretching of the plastic and then to remove some of the braking force at the end of the binding cycle to successfully cut the binding material so the cycle may be successfully started again on the next bale. Due to the elasticity of the binding material, the braking/stretch of the plastic sheet material must be removed at the end of the cycle in order to prevent excessive contraction of the plastic binding material. If there is excessive contraction of the stretched binding material, reliable feeding of the material at the start of the next bale binding cycle may not be possible.

Commonly, a roller is used to provide a stretch on the binding the material. Either the braking roller is pushed onto the roll of binding material and or the binding material is routed around the braking roller for stretching the binding material. The binding material may be wrapped around the braking roller between 100 and 300 degrees of contact with the braking roller depending on the machine type.

The applying compressive force from the braking roller pushing onto the circumference of the roll of plastic may be limited because when feeding the binding material at the start of the binding process, it would not be possible to pull the binding material from the roll of binding material due to the high rolling resistance caused by the excessive compressive forces. As a result of this limited compressive force between the braking roller and the roll of binding material, limitations will exist when stretching the binding material at the higher stretch percent-ages.

The problem presented is, if the force of the braking roller pushing onto the roll of binding material is too great, the binding apparatus will be unable to draw the binding material from the roll of binding so the binding material can enter the baling chamber. If the force of the braking roller pushing on the roll of binding is not sufficient, the release of the braking rotational force at the end of the binding cycle in order to cut the material, the momentum in the roll of binding material will cause the roll of material to rotate after the binding material has been cut and binding cycle has ended. With all of the current binding stretching systems, the stretching roller is always in contact with the binding material either through the binding material passing over, between or around the stretching roller or the stretching roller is pushing on the roll of binding material directly at all times. As a result, if the stretching is excessive or not enough, the binding material passing through the stretching roller can overrun, pull backwards or bind to the stretching roller and as a result, the binding material is not free for the start of the next binding cycle. The systems currently existing have disadvantages of needing to be finely tuning the forces to try and overcome the problems.

Document EP 3 132 672 A1 shows a binding system with a braking/stretching roller and a braking force controlled with a motor. A binding material is in constant contact with the braking/stretching roller at all stages of the binding cycle. As a result, the system needs to be finely tuned especially at the end of the cycle when cutting the binding material so the binding material does not overrun causing the binding material to fully wrap or become lodged on the braking/stretching roller.

Another example of prior art is document WO 2013/124836 A1. In this example a braked/stretch roller is in contact with a binding material and the binding material also wraps around the roller. If the binding material overruns at any point of the binding cycle or breaks at any point of the binding cycle, the plastic will inevitably become entangled and fully wrapped around the braked/stretch roller. This is a major disadvantage with these known binding systems.

SUMMARY

It is an object to provide a method for operating a round baler and a round baler with improved operation control.

For solving the problem a method for operating a round baler and a round baler as described below are provided.

According to an aspect, a method for operating a round baler is provided, the method comprising: providing a non-stop baler type machine; feeding of crop into a prechamber and a main bale forming chamber; and providing, by a binding unit, a binding material to the main bale forming chamber for wrapping a bale formed in the main bale forming chamber. The providing is comprising: in a first mode of operation, providing a stretching apparatus in contact with the binding material, thereby, applying a compressive force to the binding material for stretching the binding material; and, in a second mode of operation, providing the stretching apparatus free of contact with the binding material.

According to another aspect, a round baler is provided, comprising: a prechamber; a main bale forming chamber; a feed channel configured to feed crop into at least one the prechamber and the main chamber; and a binding unit, comprising a stretching apparatus. The binding unit is configured to: provide a binding material to the main bale forming chamber for wrapping a bale formed in the main bale forming chamber; in a first mode of operation, provide the stretching apparatus in contact with the binding material, thereby, applying a compressive force to the binding material for stretching the binding material; and, in a second mode of operation, provide the stretching apparatus free of contact with the binding material.

In the first mode of operation there is physical contact between the stretching apparatus and the binding material. The compressive force which in some embodiment may also be referred to as braking force in turn will cause friction between the stretching apparatus and the binding material, thereby, stretching the binding material (compared to a non-stretched condition) by a certain amount adjustable by the adjusting the compressive force applied by the stretching apparatus.

In the second mode of operation, for the binding unit, the stretching apparatus is removed from contact with the binding material.

The providing may comprise providing a first stretching roller in contact with the binding material. The first stretching roller may be provided as or with a first braking roller. A braking force may be applied to the first braking roller for stretching the binding material.

The providing may comprise providing a second stretching roller in contact with the binding material. The second stretching roller may be provided as or with a second braking roller. A braking force may be applied to the second braking roller for stretching the binding material.

The first and second stretching (braking) rollers may be moved simultaneously for at least one of providing the first and second stretching rollers in contact with the binding material/first stretching roller and for providing both the first and second stretching rollers free of contact with the binding material/first stretching roller.

The first and second stretching rollers may be moved by a single actuator. Alternatively, the first and second stretching rollers may be operated by separated actuators each of which is assigned to only one of the stretching rollers. In the different embodiments, the actuator(s) may be provided with a hydraulic and/or a mechanical mechanism such as a spring mechanism for moving the stretching roller(s) against the binding material.

A first compressive force may be applied to the binding material by the first stretching roller, the first compressive force being different from a second compressive force applied to the binding material by the second stretching roller. Alternatively, the first and second compressive forces may be equal. Together the first and second compressive forces provide for a total compressive force. The first and second compressive forces may be separately adjustable.

The applying may comprise applying the compressive force against a circumference of a binding material roller which is supporting the binding material and from which the binding material is unrolled for providing the binding material to the main bale forming chamber.

The applying may comprise applying the compressive force against a side of the binding material, wherein an opposite side of the binding material is unsupported.

The method may comprise providing a compressive force against at least one of a surface of the first stretching roller and a surface of the second stretching roller. The compressive force may be applied by pushing some braking element against the rollers surface, thereby, causing friction between the rollers surface and the braking element.

By the compressive force against the surface of at least one of the stretching (braking) rollers a second braking force may be provided, the second braking force being provided in addition to the compressive force (first braking force) against the binding material. The second braking force is applied to the rotation of at least one of the first and second stretching (braking) rollers. In an example, the first compressive force (first braking force) may be applied to the binding material by the first (stretching) braking roller. A second compressive force (second braking force) may be applied to the rotation of at least one of the first and second braking rollers surface which results in the stretching of the binding material. The first compressive force may be different from secondary braking force. Thus, in this example, the stretching of the binding material can be adjusted by adjusting at least one of the first compressive force (applied by the stretching roller(s) against the binding material) and the second compressive force (against the surface of the stretching roller(s)). A primary and a secondary braking mechanism are provided.

The sum of the primary braking force(s) (i.e. force applied to the binding material by the stretching roller) and the secondary braking force(s) (i.e. force applied to the rotation of the braking rollers surface) provide in totality the braking for the binding apparatus for stretching the binding material.

In the first mode of operation for the braking device or apparatus there is physical contact between the braking (stretching) roller(s) and the binding material. The compressive force of the braking roller(s) applied compresses on the binding roll. Such force may be the result of a primary and a secondary braking apparatus/mechanism. The secondary braking apparatus which applies a positive braking force to the rotating stretching (braking) roller(s) being in contact with the binding material which adds to the overall braking force. The primary braking mechanism applies a frictional force to the braking roller to reduce the braking rollers rotational speed to provide the stretching rate to the binding material.

According to a further aspect, a method for operating a round baler may be provided, comprising: providing a nonstop baler type machine; controlling a feeding mechanism for feeding of crop into a prechamber and a main bale forming chamber by a control system of the baler; in a feeding operation, feeding the crop through a first feeding channel into the prechamber; and switching the feeding operation by the control system, thereby, stopping feeding the crop into the prechamber and starting feeding the crop through a second feeding channel into a main bale forming chamber of the baler. The control system is configured to switch the feeding operation in response to a binding material parameter reaching a predetermined parameter value, the binding material provided for wrapping a bale formed in the main bale forming chamber.

According to still another aspect, a round baler may provided, comprising: a prechamber; a main bale forming chamber; a first feed channel configured to feed crop into the prechamber; a second feed channel configured to feed the crop into the main bale forming chamber; and a control system. The control system is configured to switch a feeding operation for feeding crop into the prechamber and, after stopping feeding of the crop into the prechamber, starting feeding the crop into a main bale forming chamber; and to apply the switching in response to a binding material parameter reaching a predetermined parameter value, the binding material provided for wrapping a bale formed in the main bale forming chamber. The round baler may be a nonstop baler type machine.

The technology of applying the control system for a round baler may be provided for the round baler comprising the binding unit as disclosed above.

The control system may be configured to switch the feeding operation when the binding material reaches a predetermined location between 0 and 360 degrees on the circumference of the bale formed in the main bale forming chamber.

The control system may be configured to switch the feeding operation when the binding material reaches a predetermined value corresponding to a point in the circumference of the main bale forming chamber.

The control system may be configured to switch the feeding operation as the binding material is wrapping the bale formed in the main bale forming chamber.

The control system may be configured to switch the feeding operation when the binding material is wrapping the bale formed in the main bale forming chamber.

The control system may be configured to determine the length of the binding material wrapped around the bale, and to switch the feeding operation when the length of the binding material wrapped around the bale reaches a specific length.

The method may further comprise: stopping the crop from entering the main bale forming chamber at a predetermined value of a binding cycle for wrapping the bale by the binding material; and covering the binding material by a volume of the crop.

The binding material may be provided as at least one of a plastic binding material and a sheet material. The binding material may provide an oxygen barrier when wrapped around the bale.

The method may further comprise switching the feeding operation by switching a moveable plate in a crop channel.

With respect to the round baler, the aspects described above with respect to the method for operating may apply mutatis mutandis.

In a further example, a round baler for forming a bale from a crop product is provided. The round baler comprises a prechamber provided with a first feeding channel to feed crop into the prechamber and a main bale forming chamber provided with a second feeding channel to feed crop into the main bale forming chamber. The baler further comprises a feeding mechanism which is configured to feed crop to the prechamber and/or to the main bale forming chamber. Also, the baler comprises a control system for controlling the feeding mechanism, wherein the control system is configured to stop feeding crop to the prechamber and start feeding crop to the main bale forming chamber and/or stop feeding crop to the main bale forming chamber and start feeding crop to the prechamber. The control system is configured to switch the feeding operation when the binding material has a specific parameter, e.g. a specific length.

In operation, the main bale forming chamber may be filled to form a bale of crop material. The binding cycle may begin prior to the main bale forming chamber reaching a full state, as the binding material is applied onto the bale of crop material; incoming crop encloses a starting end of the binding material into the bale of crop material. At a predefined point, e.g. when the binding material has a specific length and/or the binding material reaches a predefined location on the bales circumference, the control system may switch the crop flow from the main bale forming chamber to the prechamber.

In particular, the process of enclosing a first part of the binding material at a predetermined location on the circumference of the bale may be automated. A minimum quantity of crop needed to enclose the first part of the binding material in the bale's circumference can be defined as part of the automation of the machine's crop flow and baling systems. For example, the length of the binding material wrapped around the bale can be determined. A specific length of the binding material may lead to the conclusion that the binding material has reached the predetermined location so that it is ensured that some crop is arranged on the binding material.

In an example, the control system starts the binding of the bale prior to the bale reaching its 100% size and density, resulting in the binding material reaching a designated radial position on the circumference of the bale as the bale reaches the full 100% in size and density as preselected parameters by the control system followed by the process of the crop switching paths to the prebale forming chamber.

In another example, the control system automatically adjusts (correction process by the control system) the starting % bale size and density of the bale control the starting of the binding and therefore at 100% bale size and density, the binding material is seated on a preselected radial point on the bales circumference as such point the crop passage is altered from the main bale forming chamber into the prebale forming chamber In an example, the starting of the binding at a % bale size and density can be altered/corrected automatically by the control system depending on the result of the previous bale, the control system automatically calculates the finished size and density of the bale post binding cycle resulting in a corrective calculation to start the next binding cycle at a later % bale size and or density or at an earlier % bale size and density depending on the final bale size and density calculation of the bale post binding cycle For another example, the control system automatically calculates and adjusts the starting of the bale size and density for the binding to start resulting in a final bale size that is consistent with the initial parameters inputted into the control to have a final bale of product that is comparable in size and density to the actual parameters inputted or preset on the balers control system.

The control system may be configured to change a direction of the flow of the crop material feeding into the main bale forming chamber into the prechamber. The control system may be programmed to alter the direction of flow of the crop material when the binding material is any location from 0 to 360 degrees on the bale's circumference in the main bale forming chamber.

The linear length of the binding material may be measured as it wraps the bale of crop in the main bale forming chamber. When the binding material reaches a certain predetermined set value which corresponds to a point in the baling chamber's circumference, the control system may alter the direction of the crop from one chamber to the other chamber. As a result, the crop flow is automatically stopped from entering the main bale forming chamber at a predetermined value in the binding cycle and the binding material can be covered by a specific volume of incoming crop which may be automatically controlled by the control system, therefore removing the need for an action by the operator of the machine.

A predetermined value selected in the control system, which may be linearly linked to a location in the bale chambers circumference, may not be affected by a rotational speed of the main bale forming chamber and/or the prechamber. The rotational speed of the chambers may be directly related to a linear speed at which the binding material enters the main bale forming chamber and follows the bales circumference. As a result, the predetermined point for switching the crop from one of the chambers to the other chamber will remain the same.

A system to obtain signalled information from the machine may be provided, a calculating process to translate information through formulation and a means for the formulated information to influence the devices on the baling machine to control the crop flow into either of the baler's chambers may be provided.

Signalled information may be obtained and recorded from the chambers' rotational speed. In addition or alternatively, signalled information may be obtained from the main bale forming chamber concerning the pressures within the main bale forming chamber of compressing the crop material into a bale and signalled information may be recorded concerning the bale size within the main bale forming chamber.

A calculating process may be applied to provide simultaneous calculation from the signals received from the chambers. When a predetermined value is reached for the bale pressure and/or the bale size, the binding unit may be activated by the control system. The binding material is then fed into the main bale forming chamber. As the binding material is fed into the main bale forming chamber, further signalled information may be relayed back to the control system. The signalled information may then be processed and a formulation process may take place to calculate the length of the binding material entering the main bale forming chamber. When a predetermined value is reached, the control system may send a signal to change the crop flow direction from one chamber to the other chamber.

The switching of the crop flow from one chamber to the other chamber when the binding material has reached a predetermined set value may be automated by the baler's systems.

The crop may be switched from the main bale forming chamber to the prechamber with a moveable plate in a crop channel. Signalled information may be related back to a processor of the control system, and the processor may engage in a process to translate the signalled information into positional information to relay the position of the plate in the crop channel. The signalled information may later be relayed to the processor concerning the bale size and/or the density of the bale. At a predetermined value for the bale density and/or the bale size, the processor may relay information to start the binding process. Signalled information may be relayed back from the binding unit's feeding roller to determine the length of binding material entering the main bale forming chamber. The signalled information received by the baler's processor may be calculated using formulation resulting in a linear length of the binding material entering the main bale forming chamber being determined. When a preselected length of binding material has entered the main bale forming chamber, the processor may signal to the control system to move the crop to the prechamber.

The control system may start the binding of the bale prior to the bale reaching its 100% (full) size and density, resulting in the binding material reaching a designated radial position on the circumference of the bale as the bale reaches the full 100% in size and density as preselected parameters by the control system followed by the process of the crop switching paths to the prebale forming chamber.

The control system may automatically adjust (correction process by the control system) the starting bale size and density (<100%) of the bale control the starting of the binding and therefore at 100% bale size and density, the binding material is seated on a preselected radial point on the bales circumference as such point the crop passage is altered from the main bale forming chamber into the prebale forming chamber.

The starting of the binding at a starting bale size and density (<100%) can be altered/corrected automatically by the control system depending on the result of the previous bale, the control system automatically calculates the finished size and density of the bale post binding cycle resulting in a corrective calculation to start the next binding cycle at a later % bale size and or density or at an earlier % bale size and density depending on the final bale size and density calculation of the bale post binding cycle The control system may automatically calculate and adjust the starting bale size and density for the binding to start resulting in a final bale size that is consistent with the initial parameters inputted into the control to have a final bale of product that is comparable in size and density to the actual parameters inputted or preset on the balers control system.

The control system may start the binding of the bale prior to the bale reaching its 100% (full) size and density, resulting in the binding material reaching a designated radial position on the circumference of the bale as the bale reaches the full 100% in size and density as preselected parameters by the control system followed by the process of the crop switching paths to the prebale forming chamber.

The control system may automatically adjust (correction process by the control system) the starting bale size and density (<100%) of the bale control the starting of the binding and therefore at 100% bale size and density, the binding material is seated on a preselected radial point on the bales circumference as such point the crop passage is altered from the main bale forming chamber into the prebale forming chamber.

The starting of the binding at a starting bale size and density (<100%) can be altered/corrected automatically by the control system depending on the result of the previous bale, the control system automatically calculates the finished size and density of the bale post binding cycle resulting in a corrective calculation to start the next binding cycle at a later % bale size and or density or at an earlier % bale size and density depending on the final bale size and density calculation of the bale post binding cycle The control system may automatically calculate and adjust the starting bale size and density for the binding to start resulting in a final bale size that is consistent with the initial parameters inputted into the control to have a final bale of product that is comparable in size and density to the actual parameters inputted or preset on the balers control system.

It is another aim to
a) provide a binding system with a stretching mechanism that does not need to be finely tuned,
b) remove the possibility of the binding material wrapping or becoming entangled on the stretching/braking roller at any stage during the application of binding material to a bale of crop during the binding cycle, and/or
c) provide the possibility to apply a compressive force from the braking apparatus onto the roll of binding during the stretching of the binding material.

It is also an aim to improve on the apparatus and process required to feed the binding material into the chamber reliably. This may be achieved by removing all contact of the stretching/braking roller with the binding material at the start of the binding cycle so all frictional forces are removed when feeding the binding material from the roll of binding material into the baling chamber to an accurate reliable level and/or by releasing the stretching/brake at the end of the binding cycle for a reliable ending to the cycle so the next binding cycle starts again reliably.

With regard to sheeted type binding materials, the invention aims to increase the level of reliability when applying a binding material to a round or rectangular bale.

A binding unit is provided. The binding unit may comprise a feeding means which is configured to feed a binding material into a baling chamber; a stretching means which is configured to stretch the binding material when wrapping the bale of material within the baling chamber; and/or a cutting means which is configured to cut the binding material when the preselected length of binding material has covered the bale.

The stretching means may comprise a stretch roller/braking roller with an external braking force applied to the stretch roller in order to provide a braking effect for the binding material while in contact with the binding material. A non-stretching means may comprise the stretching means configured to automatically remove all external braking forces applied to the stretch roller while in the same configuration removing all physical contact with the binding material.

Also, a stretching apparatus for the binding material may comprise multiple of modes within one stretching means apparatus. In "feeding of the binding material into the chamber" mode, the stretching apparatus may remove contact with the binding material. In "binding material initial stretch" mode, the stretching apparatus may move the stretch roller into a free rolling contact with the binding material roll. In a "2nd stretch" mode, the stretching apparatus may apply a predetermined force to the stretch roller which applies a stretch to the binding material. In "initial end of cycle" mode, the braking force (compressive force) from the stretch roller may be removed and the stretch roller may remain in free rolling contact. In "out of contact" mode with the binding material roll, a "2nd end of cycle" mode may allow the cutting of the binding material with the application of a braking force on the stretch roller simultaneously as the cutting action is taking place.

The binding unit may be provided with a stretching means and a non-stretching means controllable by an actuating means. The braking apparatus may comprise a means of controlling the braking forces to stretch the binding material and/or may comprise a means of controlling the location of the stretching roller means in relation to the location of the binding material from physical contact with the binding material in a general forward and reverse movement.

The stretching means apparatus actuator may comprise a dual function. A single actuating means may remove the stretching means from contact with the binding material and alternatively may position the stretch roller combined with the braking apparatus of the stretch roller onto the binding material to achieve a preselected stretch ratio.

Also, a binding material stretching means may be provided. The binding material stretching means may comprise a stretching apparatus comprising stretching roller and braking means, for the stretch roller. The stretch roller may comprise dual braking means. A secondary braking means may comprise an independent braking force on the stretch roller provided by a means independent of the braking apparatus of the stretch roller onto the binding material. A primary stretching roller braking means may be responsible for the primary braking forces on the binding material supplemented by the secondary braking means independent of the primary braking means dually combining to provide the preselected binding material stretch ratio.

A binding material stretching means may be provided which may comprise a stretching apparatus comprising stretching roller and braking means, for the stretch roller. The stretching apparatus may comprise a plurality of stretching means independently applying braking forces to the stretch roller. Primary forces may be applied through an actuator applying a friction means on the stretch roller to brake the stretch roller. A secondary breaking means may apply a secondary force to the stretch roller through the stretch roller supporting frame by an external force independent of the friction means providing the primary braking means on the binding material. The secondary force may create additional frictional contact between the inner tube of the roll of binding material and a center supporting axle while the primary stretching means may create a braking to the rotational speed of the stretch roller.

A binding unit may be provided. The binding unit may comprise multiple independent braking forces comprising primarily of primary and secondary forces each of which may contribute to the surface contact pressure applied between the binding material stretch roller and the roll of binding material. The primary stretching roller braking means may comprise a friction means to provide a braking force on the stretch roller, the same braking force may provide a surface contact pressure on the roll of binding material preventing slippage, while the secondary independent braking force also may provide a force complementing the primary forces for surface contact pressure on the roll of binding material preventing slippage of the stretch rollers surface against the binding materials surface.

A binding unit with a stretching apparatus in which the stretch roller may be removed from surface contact with any part of the binding materials roll or layered part of the material from dispatching from the roll through to engagement on the bale of materials circumference may be provided.

The binding unit may comprise a stretching apparatus comprising of a braked roller with braking forces causing a reversing of the direction of the braked roller. The braking forces may be applied to the external face of the stretch roller through an actuator means applying a force to the frictional means which then may apply a force to the stretch rollers outer surface resulting in a slowing down of the circumference speed of the stretch rollers surface causing the binding material dispatching from the binding material roll to slow down resulting in speed difference between the baling chamber and the dispatched binding material speeds.

The binding unit may comprise a stretching apparatus comprising an actuator. The actuator may provide multiple actions within the binding unit, may remove the stretch roller from contact with the binding material for feeding of the binding material at the start of the cycle, may engage the braking means, may apply the preselected pressure on the braking means, e.g. by the extension of springs, may regulate the braking means for the end of the binding cycles cutting phase and may remove the stretch roller to an area external of that of the roll of binding materials circumference diameter to recharge the binding unit with a full roll of binding material.

It may be possible to apply large compressive forces between the braking roller and the roll of binding material which forces may not be limited by the force necessary to pull the binding material from the roll of binding material at the start of the binding process. When feeding the binding material, the large compressive forces may be removed completely by the functionality of the binding unit, for example by removing the stretch roller from contact with the binding material.

The binding unit may be provided with a stretching apparatus that provides a rotational/lateral movement of the braking means, the stretching apparatus moving the braking means in a positive working direction to apply a braking force onto the roll of binding material and therefore onto the sheeted material dispensing from the roll of binding material. Deactivation of the stretch of the binding material may be provided by the stretching apparatus and braking means moving in a direction opposite the working direction, increasing the distance between the circumferences of the braking roller of the braking means and the circumference of the roll of binding material.

The binding unit may comprise a stretching apparatus with a braking means. For braking, the braking means may move in a positive direction towards the binding material roll, resulting in the distance between the circumference of the braking means roller and the circumference of the roll of binding material decreasing until reaching a value of zero. Further movement in the positive direction may result in compressive forces of the braking means against the binding material roll.

The binding unit may comprise a stretching apparatus with a braking means. When a working mode of the binding unit is activated, the braking means may move in a positive direction until the braking means braking roller's circumference makes contact with the circumference of the binding material. After physical contact has been made, the braking means may apply a compressive force to the roll of binding material.

The binding unit comprising the stretching apparatus and the roll of binding material may be represented by a Venn diagram with two sets. Set one (denoted as A) may represent the braking apparatus and set two (denoted as B) may represent the roll of binding material. The intersection of the sets A and B may represent the braking apparatus being in physical contact with the circumference of the roll of binding material. The union of the sets A and B may represent the binding unit comprising the stretching apparatus and the roll of binding material.

The binding unit may comprise a stretching apparatus. The stretching apparatus may comprise a braking roller. A braking force on the circumference of the braking roller may translate into a compressive force on the contact surface area between the circumference of the braking roller and the circumference of the roll of binding material. An increase in the force on the brake may lead to an increase in the compressive force between the braking roller and the binding material roll. There may be a linear relationship between the increase in braking resistance on the braking roller and the increase of the compression forces between the braking roller and the roll of binding material. The compression force between the braking roller and the roll of binding material may increase the surface friction between the braking roller and the circumference of the roll of binding material. The increase in surface friction may decrease the probability of slippage occurring between the surface of the braking roller and the surface of the roll of binding material during the stretching of the binding material.

BRIEF DESCRIPTION OF THE DRAWINGS

Following, further embodiments are described by referring to figures. In the figures show.

DETAILED DESCRIPTION OF THE DRAWINGS

Figure 1:
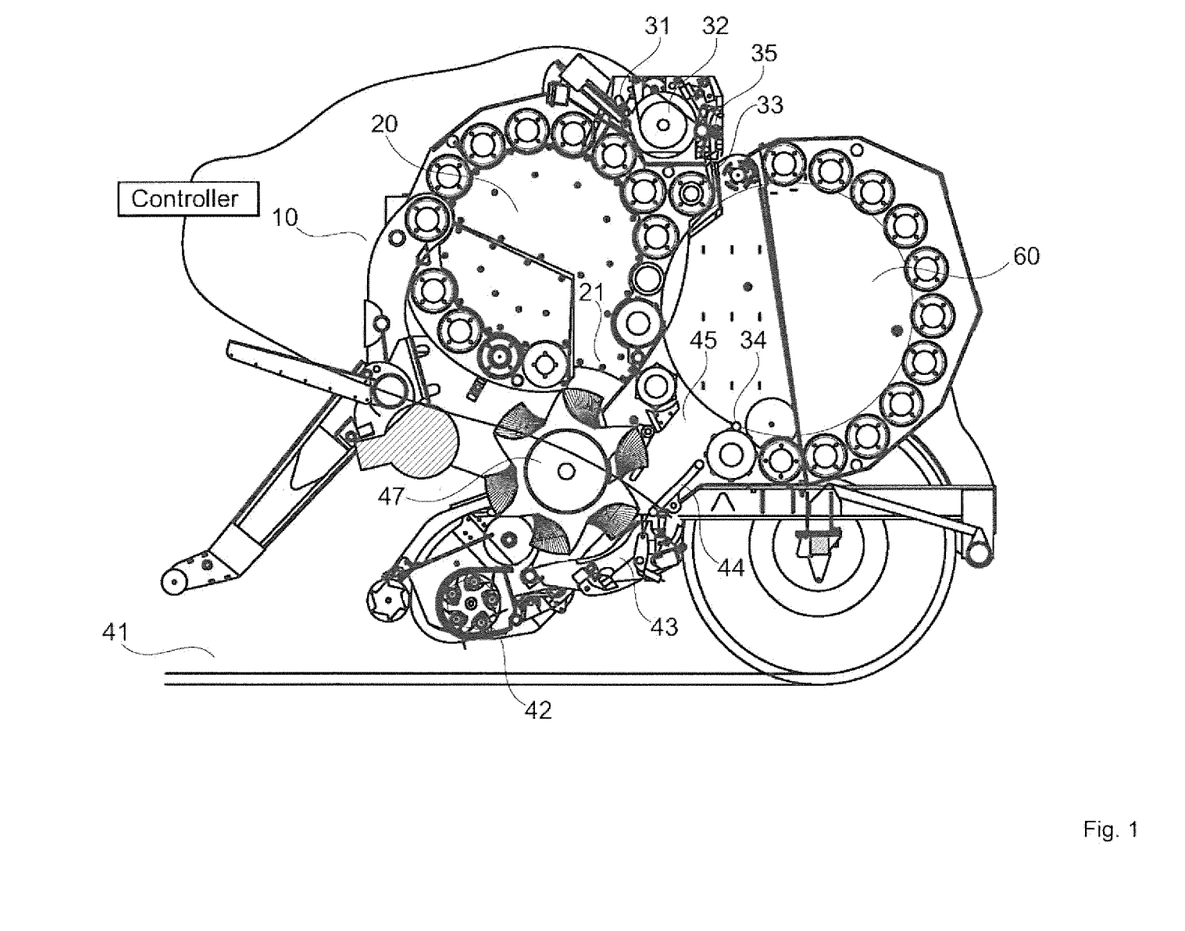
FIG. 1 a schematic representation of crop flow to the main bale forming chamber, the crop flow entering the chamber encloses the binding material between the outer layer of crop on the bale and the inner material on the bale.

FIG. 1 shows a schematic representation of a baling machine 10 of the nonstop type. The baling machine 10 is provided with a prechamber 20 in which a preformed bale is prepared in the process of forming a bale from crop 41. There is a feeding channel 21 configured to feed the crop 41 picked up by a crop pickup mechanism 42 to the prechamber 20.

There is a second feeding channel 45 for feeding or guiding the crop 41 into a main baling forming chamber 60. In the main bale forming chamber 60 a full bale of crop material is prepared.

A crop cutting device 43 is provided. A crop switching plate 44 can be pivoted on the rear side of the crop cutting device 43 for guiding the crop 41 to at least one of the prechamber 20 and the main bale forming chamber 60.

The feeding of the crop 41 is conducted by a feeding mechanism 47.

Figure 2:
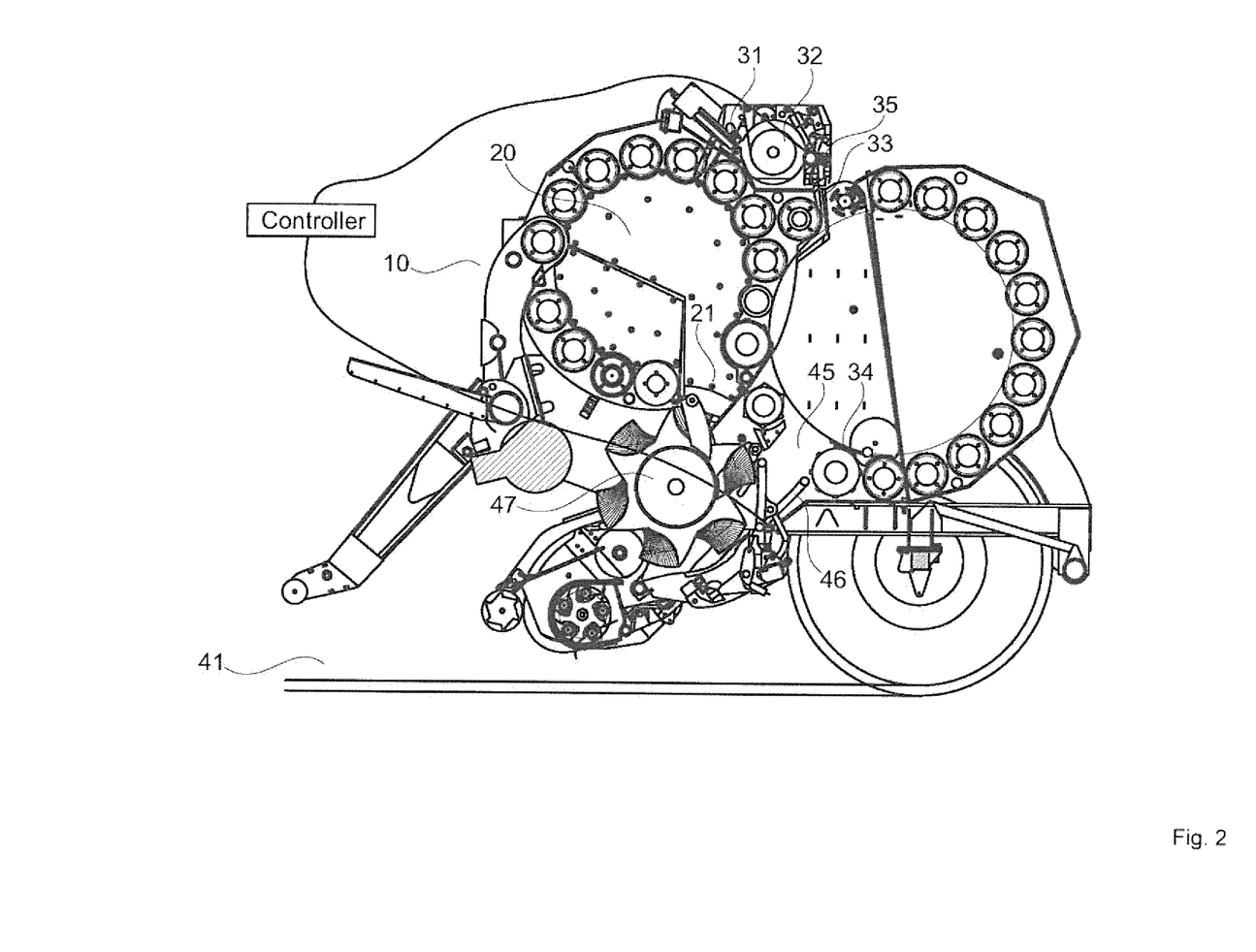
FIG. 2 a schematic representation of the switching of the crop flow to the baler's prechamber at a predetermined point on the bales circumference of the binding material.

While according to FIG. 1 the crop 41 is fed to the main bale forming chamber 60, the crop 41 is fed to the prechamber 20 according to FIG. 2 when the crop switching plate 44 is in a different position compared to FIG. 1.

A binding apparatus 31 is provided for the baling machine 10. The binding apparatus 31 is provided with a roll 32 of binding material. A binding material pathway 33 is provided. A tail end 34 of the binding material is on the circumference of the bale 11.

Further, a feeding roller 35 is provided for the binding apparatus 31.

Referring to FIGS. 3 to 7, further aspects are described, specifically with respect to the binding apparatus 31 provided in a binding unit 100.

In FIGS. 3 to 6 bale chamber rollers 102 are depicted applied for forming the bale 11.

A braking apparatus structure 111 is provided.

There are binding material guide rollers 112.

The binding unit 100 is provided with a frame 113. With respect to the binding unit 100, a binding apparatus grouping mechanism 114 and a binding material cutting mechanism 115 are provided.

A part 116 of the binding material is entering the main bale forming chamber 60 between one of the bale chamber rollers 102 and the circumference of the bale 11.

The binding material is provided by a roll of binding material 117. The binding material is moved along a path 118 when leaving the roll of binding material 117.

A stretch roller 119 (stretching/braking roller) is provided.

A secondary force depicted by reference numeral 120 is applied to the stretch roller 119.

There is a braking roller 121 of the braking apparatus structure 111 for providing a braking mechanism.

A primary force depicted by reference numeral 122 is applied to the stretch roller 119.

There is a primary force monitoring device 123.

A connecting rod 124 is connecting an actuator for braking in the brake mechanism.

Further, a binding material feeding roller 125 is provided.

Figure 3:
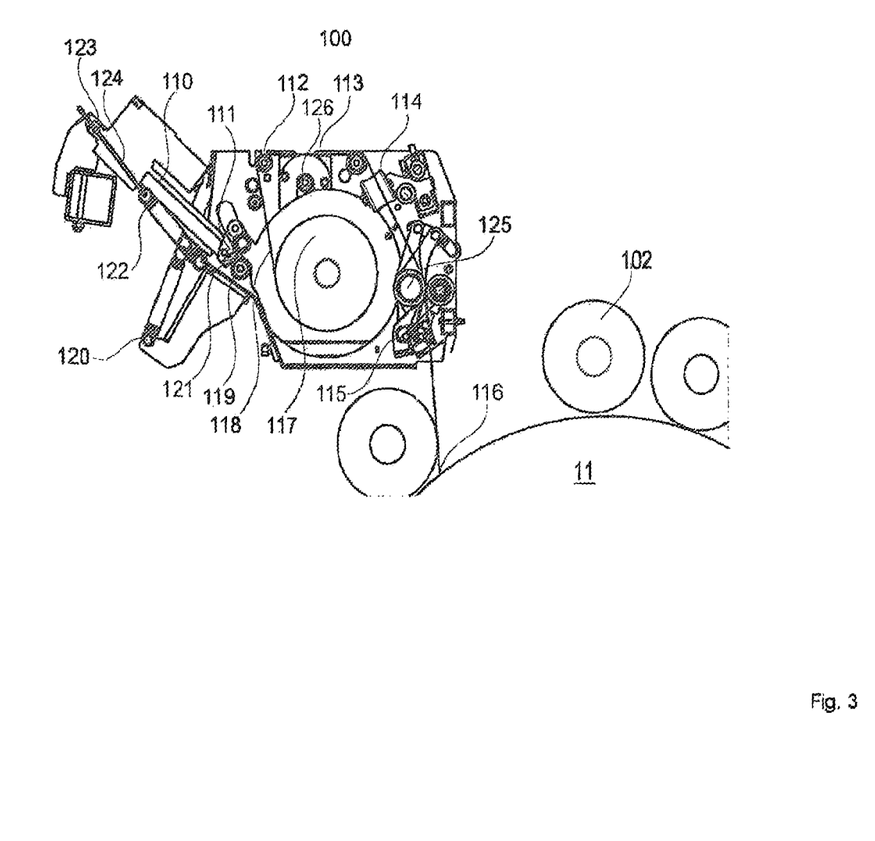
FIG. 3 a schematic representation of a binding apparatus, wherein the binding apparatus is provided with a braking mechanism, within the braking mechanism the stretch roller locates in the parked/binding roll recharge position.

FIG. 3 shows a schematic representation of a binding apparatus, wherein the binding apparatus is provided with a braking mechanism, within the braking mechanism the stretch roller locates in the parked/binding roll recharge position. In this state, the binding unit 31 is in a switch over state, the braking mechanism 121 is lifted into a home position so the binding material roll can be recharged when the binding material 117 goes empty.

Figure 4:
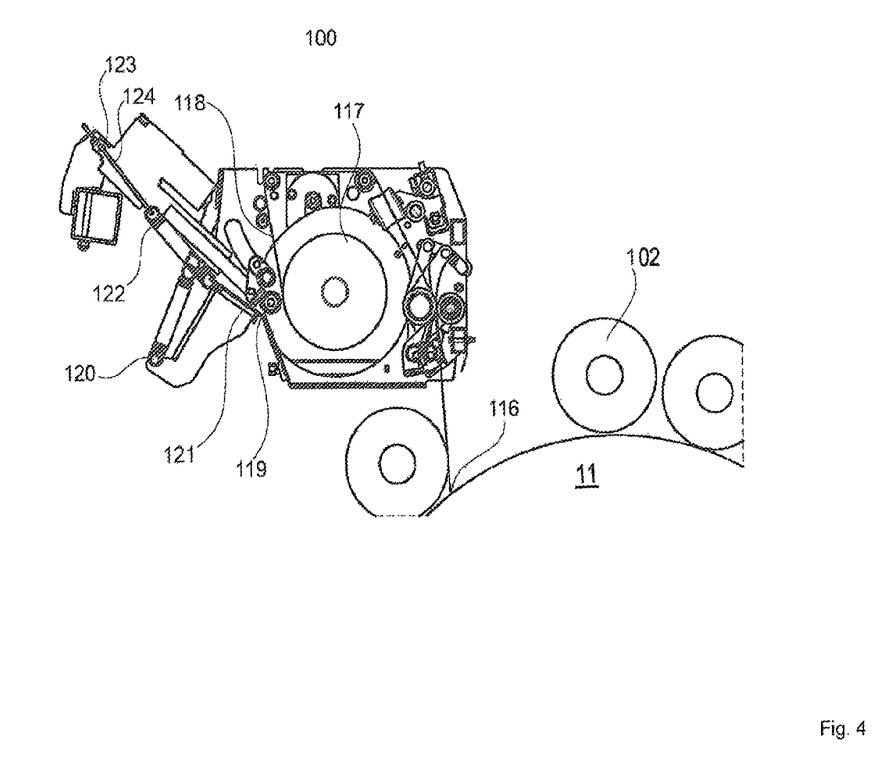
FIG. 4 a schematic representation of a binding apparatus, wherein the braking mechanism is shown, within the braking mechanism the stretch roller locates in the binding feed position, located away from the binding material.
Figure 5:
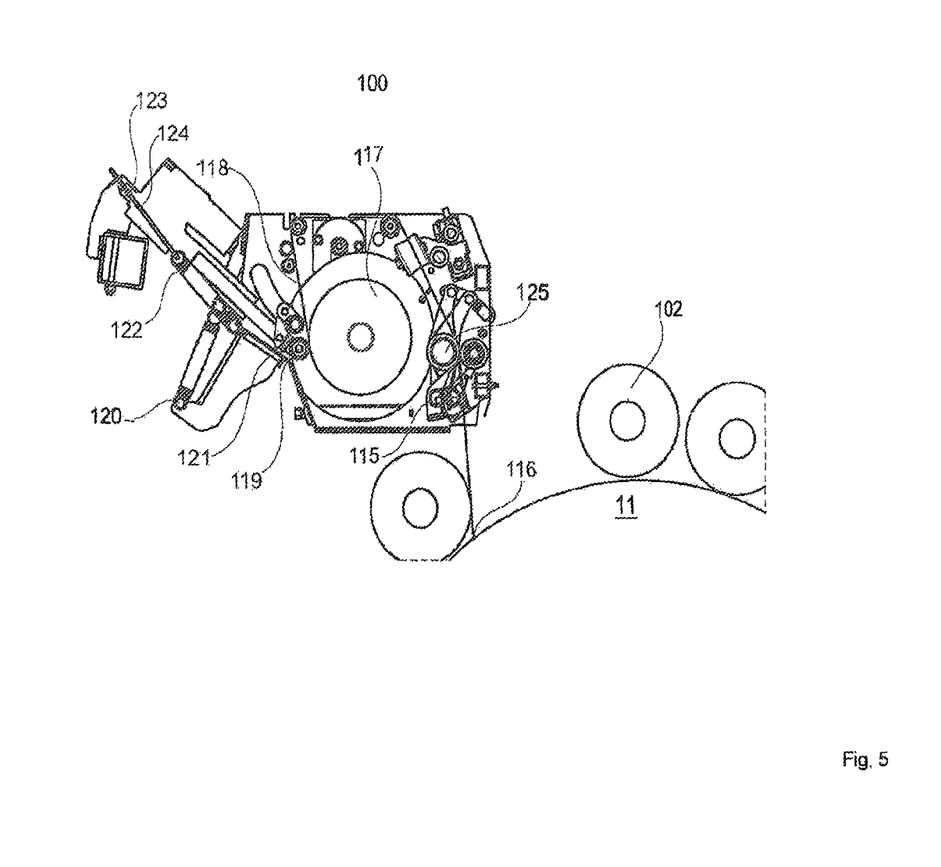
FIG. 5 a schematic representation of the binding apparatus, wherein the braking mechanism is shown, within the braking mechanism the stretch roller locates in the stretching position, the stretching position, the stretch roller applying a braking force on the binding material roll.

FIG. 4 shows a schematic representation of a binding apparatus, wherein the braking mechanism is shown, within the braking mechanism the stretch roller locates in the binding feed position, located away from the binding material. The binding unit 31 is now engaged in the working mode, the roll of binding material 121 is in position and the braking mechanism 121 is lifted from the binding materials surface so the binding material can be pulled from the roll and fed into the baling chamber 60. The binding material follows a path 118 from the circumference of the binding material roll over the guiding rollers 112, between the plastic grouping system 114, through the binding systems feeding rollers and cutting mechanism and in-to the baling chamber 60.

Figure 6:
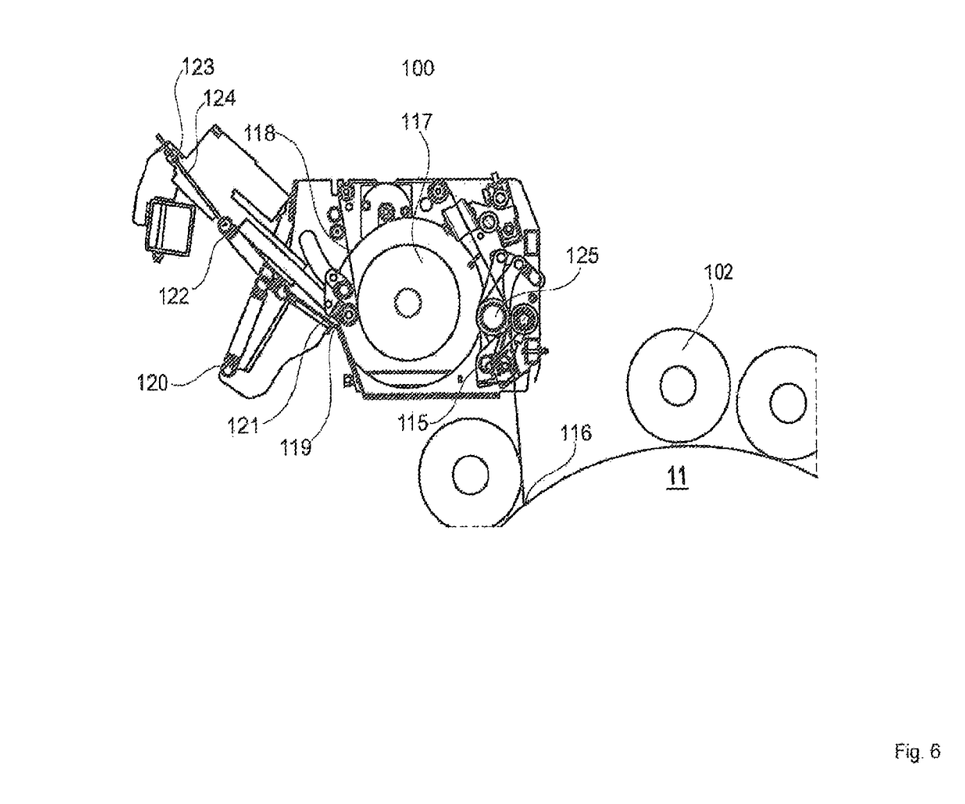
FIG. 6 a schematic representation of the binding apparatus, wherein the braking mechanism is shown, within the braking mechanism the stretch roller locates in the binding completion position; the stretch roller locates in a non contact position with the binding material.

FIG. 6 shows a schematic representation of the binding apparatus, wherein the braking mechanism is shown, within the braking mechanism the stretch roller locates in the binding completion position. The primary braking apparatus is removed from the stretching roller locates, the roll of binding material 117 is in position and the primary braking mechanism 121 is lifted from the braking roller so the binding material can be cut by the binding unit 31 knife unit 115.

Figure 7:
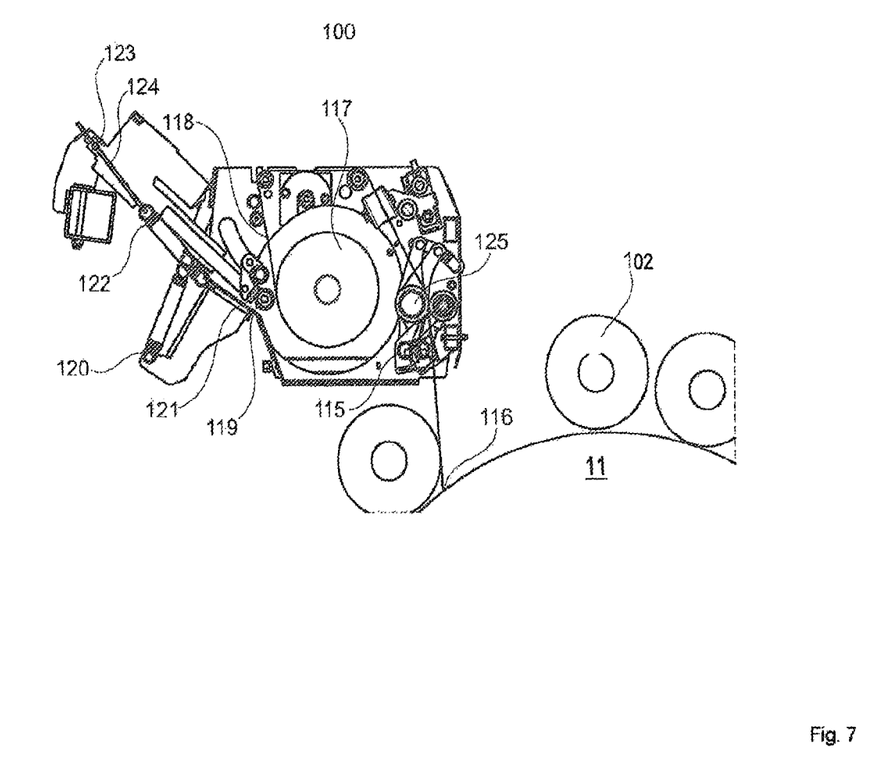
FIG. 7 a schematic representation of the binding apparatus, wherein the braking mechanism is shown, within the braking mechanism the stretch roller locates in the binding material roll change recharge position.

FIG. 7 shows a schematic representation of the binding apparatus, wherein the braking mechanism is shown, within the primary braking apparatus 121 is removed from the braking roller and the secondary braking force 120 is removed by the lifting of the braking roller 119 from being in contact with the binding material 117.

The features disclosed in this specification, the figures and/or the claims may be material for the realization of various embodiments, taken in isolation or in various combinations thereof.

REFERENCE LIST

10 Baling machine of the nonstop type
11 Bale
20 Prechamber
21 Feeding channel entering the prechamber
31 Binding apparatus
32 Roll of binding material
33 Binding material and binding material pathway
34 Tail end of the binding material on the bale's circumference
35 Feeding roller and binding material cutting mechanism
42 Crop pickup mechanism
43 Crop cutting device
44 Crop switching plate pivoting on the rear side of the crop cutting device, in this position guides crop to the main bale forming chamber
45 Crop channel for guiding crop into the main baling chamber
46 Crop switching plate pivoting on the rear side of the crop cutting device, in this position guides crop to the main bale forming chamber
47 Feeding mechanism
60 Main bale forming chamber with a full bale of material
100 Binding unit
102 Bale chamber rollers
103 Bale of material
111 Braking apparatus structure
112 Binding material guide rollers
113 Frame of binding unit
114 Binding apparatus grouping mechanism
115 Binding material cutting mechanism
116 Binding material entering bale chamber between roller and bale circumference
117 Roll of binding material
118 Path of binding material leaving from the roll of binding material
119 Stretch roller (Stretching/braking roller)
120 Secondary force applied to the braking roller
121 Braking roller braking mechanism
122 Primary force applied to braking roller mechanism
123 Primary force monitoring device
124 Connecting rod, connecting actuator to braking roller brake mechanism
125 Binding material feeding roller

The invention claimed is:

1. A method for operating a round baler, comprising
providing a nonstop baler type machine;
feeding of crop into a prechamber and a main bale forming chamber; and providing, by a binding unit, a binding material to the main bale forming chamber for wrapping a bale formed in the main bale forming chamber, comprising in a first mode of operation, providing a stretching apparatus comprising a first stretching roller and a second stretching roller in contact with the binding material, providing a compressive force against at least one of a surface of the first stretching roller and a surface of the second stretching roller, thereby, applying a compressive force to the binding material for stretching the binding material; and in a second mode of operation, providing the stretching apparatus free of contact with the binding material.

2. The method according to claim 1, wherein the first and second stretching rollers are moved simultaneously for at least one of providing the first and second stretching rollers in contact with the binding material and for providing both the first and second stretching rollers free of contact with the binding material.

3. The method according to claim 2, wherein the first and second stretching rollers are moved by a single actuator.

4. The method according to claim 1, wherein a first compressive force applied to the binding material by the first stretching roller is different from a second compressive force applied to the binding material by the second stretching roller.

5. The method according to claim 1, wherein the applying comprises applying the compressive force against a circumference of a binding material roller which is supporting the binding material and from which the binding material is unrolled for providing the binding material to the main bale forming chamber.

6. The method according to claim 1, wherein the applying comprises applying the compressive force against a side of the binding material, wherein an opposite side of the binding material is unsupported.

7. A round baler, comprising a prechamber;

a main bale forming chamber;

a feed channel configured to feed crop into at least one the prechamber and the main chamber; and a binding unit, comprising a stretching apparatus including a first stretching roller and a second stretching roller in contact with the binding material;

wherein the binding unit is configured to provide a binding material to the main bale forming chamber for wrapping a bale formed in the main bale forming chamber;

in a first mode of operation, provide a compressive force against at least one of a surface of the first stretching roller and a surface of the second stretching roller in contact with the binding material, thereby, applying a compressive force to the binding material for stretching the binding material; and in a second mode of operation, provide the stretching apparatus free of contact with the binding material.

* * * * *